United States Patent [19]

McKinney

[11] 4,261,528
[45] Apr. 14, 1981

[54] FISHING REEL WITH COUNTER MEANS

[76] Inventor: Tommie McKinney, 3781 Winifred, Wayne, Mich. 48184

[21] Appl. No.: 959,767

[22] Filed: Nov. 13, 1978

[51] Int. Cl.³ .............................................. A01K 89/01
[52] U.S. Cl. ................................ 242/84.1 K; 116/307; 242/84.2 A
[58] Field of Search ............ 242/84.1 K, 84.1 L, 242/84.1 M, 84.1 R, 84.2 R, 84.2 A; 235/117 A, 1 C, 1 B; 116/307; 43/25

[56] References Cited

U.S. PATENT DOCUMENTS

| 2,272,478 | 2/1942 | Poole | 235/1 C X |
| 2,613,883 | 10/1952 | Limpright | 242/84.1 M |
| 2,806,699 | 9/1957 | Spooner | 235/1 C X |
| 3,105,651 | 10/1963 | Hull | 242/84.2 A |
| 4,037,719 | 7/1977 | Perlmutter | 235/1 C X |

Primary Examiner—Billy S. Taylor
Attorney, Agent, or Firm—Charles W. Chandler

[57] ABSTRACT

A fishing reel having a counter device for indicating the number of times the fishing line is cast from its fully wound position.

3 Claims, 3 Drawing Figures

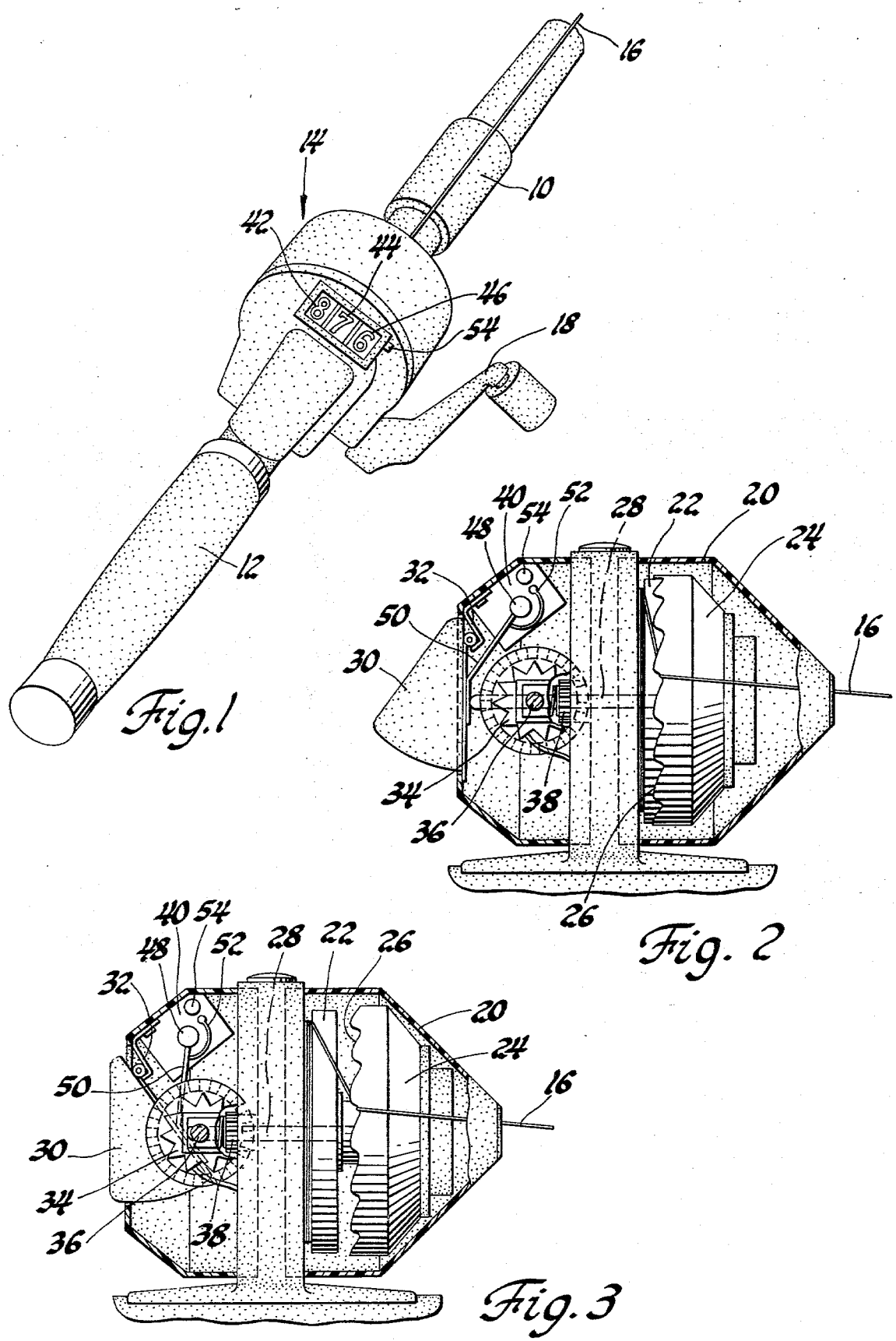

FISHING REEL WITH COUNTER MEANS

BACKGROUND OF THE INVENTION

This invention is related to fishing reels, and more specifically to a fishing reel having a counter device for indicating to the user the number of times the fishing line is cast between strikes.

Fishermen normally cast their fishing line from a reel several times before a fish strikes the lure. Although a fisherman can count the number of such casts, circumstances may cause him to lose count.

SUMMARY OF THE INVENTION

The broad purpose of the present invention is to provide a novel fishing reel having means for visually indicating to the user the number of times the fishing line has been cast from its fully wound position. In the preferred embodiment of the invention, the fishing line is wound to its fully wound position by rotating a conventional handle. The line is then prepared for casting by the user pressing a thumb-operated member which releases the line from the spool on which it is wound. As the thumb-operated member is pressed, it actuates a counter mounted in a visible position on the reel housing.

Still further objects and advantages of the present invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a perspective view illustrating a fishing reel having counter means illustrating the preferred embodiment of the invention;

FIG. 2 is a fragmentary view of the preferred reel illustrating the manner in which the counter means is connected to a thumb-operated actuater; and FIG. 3 is a view similar to FIG. 2, but showing the thumb-operated member in its depressed position.

DESCRIPTION OF THE PREFERRED EMBODIMENT

Referring to the drawing, a conventional fishing rod 10 having a handle 12 is illustrated in FIG. 1. Reel means 14 is mounted on rod 10 in the conventional manner. A fishing line 16 is connected to reel means 14 so that the user can cast an appropriate lure (not shown) as line 16 is released from a stored position within reel 14. A rotatable handle 18 is mounted on the reel for winding the line in a stored position in the reel.

Referring to FIG. 2, reel 14 includes a housing 20. A spool 22 is mounted within housing 20 and supports fishing line 16 in a stored position in which the line is wound on spool 22. A wind-up member 24 is mounted adjacent spool 22 and has an annular series of teeth 26. When member 24 is rotated in the position illustrated in FIG. 2, it engages the line and winds it onto spool 22 in a manner well known to those skilled in the art.

A pin 28 is mounted in the housing and connected to wind-up member 24 so as to be axially movable therewith. Pin 28 and member 24 are movable between a wind-up position illustrated in FIG. 2, and a released position illustrated in FIG. 3. In the wind-up position illustrated in FIG. 2, member 24 is operative to wind the line onto the spool as handle 18 is being rotated. In the release position, teeth 26 are spaced from the spool to permit the fishing line to be unravelled from the spool by the weight of the fishing lure in a casting motion.

A thumb-operated button 30 is pivotally mounted on housing 20 so as to be movable between a first position, illustrated in FIG. 2, in which it is spaced from the end of pin 28, and a second position, illustrated in FIG. 3, in which it engages pin 28 for moving member 24 toward its release position. A spring 32 biases button 30 toward its first position.

The basic mechanical linkage for rewinding the fishing line is well known to those skilled in the art and basically comprises a gear 34 connected to shaft 36 of the handle to rotate a second gear 38 mounted on pin 28. When the fishing line has been cast, the user rotates handle 18 and thereby causes the pin 28 and the wind-up member 24 to move toward the position illustrated in FIG. 2 so that as the handle 18 is rotated, the fish line is wound on spool 22. When the user desires to cast the line again, he presses button 30 to move member 24 toward its release position.

A counter device 40 having three counter members, 42, 44, and 46, is mounted adjacent button 30 and comprises any conventional counter device having a rotatable actuating arm 48 connected by actuating member 50 which is supported in a position between button 30 and the end of pin 28. The arrangement is such that when button 30 is pressed to release the line, the counter member is actuated to indicate that the line is being released from its fully wound position. When the user releases button 30, a spring 52 returns arm 50 to its initial position so that it can be actuated upon the depression of button 30. Thus each casting motion of the fishing reel actuates the counter. When the user desires to reset the counter he depresses a reset button 54 mounted on the side of the counter housing. He performs this operation when the lure has been struck by the fish.

It is apparent that a similar counter mechanism can be mounted on other types of reels so as to be actuated when the fishing line is either being released from the wind-up spool or by the motion of the wind-up spool and that such devices would fall within the scope of the appended claims.

Having described my invention, I claim:

1. In a fishing reel, the combination comprising:
   a wind-up spool;
   a rotatable handle;
   winding means mounted adjacent the spool and connected to the handle for motion therewith;
   an elongated fishing line connected to the wind-up spool to be wound thereon toward a fully wound position in accordance with the motion of the winding means, said spool being adapted to permit the line to be unwound from said fully wound position;
   counter means mounted on the reel; and
   means connected to the winding means and to the counter means to actuate same each time the fishing line is permitted to be unwound from said fully wound position whereby the counter means indicates the number of times said line has been so unwound.

2. A combination as defined in claim 1, including a thumb-operated button mounted adjacent the counter means so as to be movable from a first position in which the wind-up spool is inoperative to permit unwinding of the fishing line from said fully wound position, and a second button position in which the spool is operative to permit such movement, and the counter means is connected to the button so as to be actuated in response to the motion of the button from one of said positions to the other of said positions.

3. A counting mechanism for obtaining a cast per catch ratio comprising in combination a fishing rod; a fishing reel attached to said fishing rod and including a line release means actuatable to allow the free release of fishing line; and, a counter mechanism including means, operatively engaging said reel, for incrementally advancing said counter upon each actuation of said line release means, whereby the count of said counter is indicative of the number of casts made.

* * * * *